United States Patent
D'Acierno et al.

[11] Patent Number: 5,891,401
[45] Date of Patent: Apr. 6, 1999

[54] POROUS TUYERE FOR FLUID BED APPARATUS

[75] Inventors: John P. D'Acierno, Ridgefield; Alfredo E. Basas, Bethel, both of Conn.

[73] Assignee: Kinetics Technology International Corporation, San Dimas, Calif.

[21] Appl. No.: 869,489

[22] Filed: Jun. 5, 1997

Related U.S. Application Data

[63] Continuation-in-part of Ser. No. 794,423, Feb. 5, 1997, abandoned.

[51] Int. Cl.⁶ .......................................... B01J 8/24
[52] U.S. Cl. ........................ 422/143; 422/139; 422/311; 34/582; 110/245
[58] Field of Search .................... 422/139, 143, 422/311; 34/582, 584, 585; 110/245

[56] References Cited

U.S. PATENT DOCUMENTS

| | | | |
|---|---|---|---|
| 2,841,476 | 7/1958 | Dalton | 34/585 |
| 3,672,577 | 6/1972 | Kramer | 34/585 |
| 3,672,648 | 6/1972 | Price | 422/143 |
| 3,708,887 | 1/1973 | Erisman | 34/585 |
| 3,896,560 | 7/1975 | Knepper | 34/585 |
| 5,100,629 | 3/1992 | Tampa | 422/143 |

Primary Examiner—Krisanne Thornton
Assistant Examiner—Fariborz Moazzam
Attorney, Agent, or Firm—Seidel, Gonda, Lauorgna & Monaco, PC

[57] ABSTRACT

A fluidized bed apparatus having a gas distribution plate containing a plurality of tuyeres, which tuyeres provide a uniform gas flow from the gas chamber of the apparatus to the reactor chamber of the apparatus and prevents particulate matter of the fluidized bed from backsifting from the fluid bed chamber through the gas distribution plate to the gas chamber. The tuyeres are secured in openings in the gas distribution plate and comprise a porous plate and preferably a perforated plate superposed within a flanged two-component structure which two components are screwed together or otherwise secured together to form the tuyere.

14 Claims, 4 Drawing Sheets

POROUS TUYERE FOR FLUID BED APPARATUS

CROSS-REFERENCE TO RELATED APPLICATIONS

This patent application is a continuation-in-part of U.S. patent application Ser. No. 08/794,423, entitled "SINTERED TUYERE FOR FLUID BED APPARATUS", filed on Feb. 5, 1997 in the names of John P. D'Acierno and Alfredo E. Basas and which was abandoned by the U.S. PTO on Jan. 27, 1998.

BACKGROUND OF THE INVENTION

1. Field of the Invention

This invention relates generally to a fluid bed apparatus and, in particular, to an improved gas distribution plate of the fluid bed apparatus which plate provides enhanced gas distribution flow to the reaction chamber of the apparatus and wherein the gas distribution plate prevents backsifting of bed particles from the fluid bed reaction chamber to the windbox chamber situated below the gas distribution plate.

2. Description of Related Art

Fluid bed apparatus are well known in the art and have been used for a number of industrial processes ranging from chemical reactions to the heating and/or cooling of materials. Basically, the fluid bed apparatus comprises a chamber through which a gas is passed upwardly and the gas fluidizes solid particles in the chamber and forms a fluid bed which is typically characterized as being similar to a boiling liquid.

A typical fluid bed apparatus comprises a vertical elongated chamber having a gas distribution plate near the bottom of the chamber. Air or other gaseous material (hereinafter referred to as gas for convenience) is introduced into a windbox or gas distribution chamber below the gas distribution plate and flows upward through openings in the plate and mixes with and fluidizes particulate solid material which is contained in the reaction chamber above the gas distribution plate. When the flowing gas and solid particles are mixed a fluid bed is generated which may be characterized as a very turbulent, random moving mixture. Depending on the operation performed in the fluid bed apparatus, the fluidizing gas, typically air or nitrogen, exits at the top of the fluid bed apparatus through a flue. The space in the chamber above the fluidized bed is typically called the freeboard section where larger solid particles entrained in the gas typically separate by gravity from the rising gas stream and fall back into the fluidized bed. The gas exiting the flue usually contains some fine solid particles. Where it is necessary to remove a product from the apparatus, outlets at various parts of the apparatus are provided to remove the particles which have either been reacted, dried, cooled or otherwise treated.

It is important that the gas fed into the fluid bed apparatus and which is mixed with the solid particulate matter in the reaction chamber be evenly distributed to provide a uniform and efficient fluidized bed mixture. Typically, such uniformity is attained by using a gas distribution plate having a number of evenly spaced vertical openings across the width of the plate through which the gas travels and mixes with the solid bed particles. As can be appreciated, one of the problems with a fluid bed apparatus is that the bed particles in the chamber, which are typically fine, may fall back (backsift) through the openings in the gas distribution plate into the windbox chamber. The backsifting may not only clog the holes inhibiting or preventing gas flow therethrough but also decreases the efficiency of the operation since the backsifted particles are not in the reaction chamber and will have to be removed from the gas windbox chamber and recycled back to the fluid bed in the reaction chamber. This problem is especially serious for fluid bed solid materials which are highly flowable, small in size and have a minimum or zero angle of repose.

To overcome the problem of backsifting of bed particles below the gas distribution plate, various designs for the gas distribution plate have been developed. One of the designs utilizes adjustable ports to restrict the backsifting and such a gas/diffusion plate for a fluidized bed apparatus is described in U.S. Pat. No. 4,068,389, which patent is hereby incorporated by reference. This patent shows the use of screw studs which are screwed into openings in the gas distribution plate and wherein the openings are tapped. The screw studs are designed to provide a tortuous path of small cross-sectional area between the side of the opening and the screw stud in which the gas travels from the windbox chamber to the fluid bed chamber of the apparatus. A modified embodiment of the screw stud is the use of a machine screw having a head wherein interposed between the bottom face of the head and the upper surface of the distribution plate is a standard form of internal lock washer through which the gas passes after exiting the screw thread opening. This embodiment is preferred over the screw stud since the lock washer is in a horizontal plane whereby agitated particles are precluded from entering due to gravity. It has also been proposed to use sintered metal plates as the gas distribution plate in a fluid bed apparatus but sintered plates are typically fragile and crack due to thermal expansion stresses. Size and temperature will be limited for this type of design.

Bearing in mind the problems and deficiencies of the prior art, it is therefore an object of the present invention to provide a highly effective and efficient gas distribution plate for use in a fluid bed apparatus which minimizes backsifting of solid bed particles below the plate into the gas chamber or windbox of the apparatus.

It is a further object of the present invention to provide a fluid bed apparatus having an improved gas distribution plate which plate minimizes backsifting of solid bed particles from the reaction chamber to the gas chamber or windbox of the apparatus while still providing highly effective and efficient gas distribution to the reaction chamber of the apparatus.

It is yet another object of the present invention to provide a method for operating a fluid bed apparatus wherein there is a minimum of backsifting of bed particles from the reaction chamber to the gas chamber or windbox of the apparatus.

Another object of the present invention is to provide a tuyere for use in the gas distribution plate of a fluid bed apparatus whereby gas flows upward through a plurality of the tuyeres and fluidizes solid particulate matter in the apparatus without any significant backsifting of solid particles through the tuyeres.

Still other objects and advantages of the invention will in part be obvious and will in part be apparent from the specification.

SUMMARY OF THE INVENTION

The above and other objects and advantages, which will be apparent to those skilled in the art, are achieved in the present invention which is directed to, in a first aspect, to a fluid bed apparatus comprising:

a vessel;

a reaction chamber within the vessel;

a flue at the upper end of the vessel;

a gas chamber within the vessel, the gas chamber or windbox and reaction chamber being separated by a gas distribution plate;

the gas distribution plate defining a plurality of openings in which are secured a plurality of tuyeres, the tuyeres comprising a first member, preferably cylindrical, and defining an opening therethrough which first member is secured in one of the plurality of openings in the distribution plate and a porous plate is secured in the opening of the first member and wherein during operation gas passes from the gas chamber or windbox to the reaction chamber by traveling upward through the porous plate secured in the opening of the tuyere. The porous plate is typically fabricated from a suitable material, such as, but not limited to sintered metal, porous ceramic or ceramic fiber.

A preferred tuyere additionally comprises a perforated plate positioned below and proximate to the sintered plate.

A highly preferred tuyere comprises an upper cylindrical member having an axial opening therethrough which is secured in the plate opening, the cylindrical member having an inward flange at its upper end, a porous plate positioned within the upper cylindrical member, and, preferably a perforated plate positioned below the porous member, with the porous member and a perforated plate being secured in the upper cylindrical member by the flange and by a lower cylindrical member having an axial opening therethrough which is secured to the upper cylindrical member, and wherein air or other fluidizing gas passes from the gas chamber to the reaction chamber by traveling upwards through the tuyeres sequentially through the lower cylindrical member, the perforated plate, if one is used, the porous member and the upper cylindrical member into the fluid bed reaction chamber.

In a related aspect, the upper cylindrical member of the tuyere has internal threads which mate with external threads of the lower cylindrical member so that when the upper cylindrical member and lower cylindrical member are threaded together the porous plate and a perforated plate are secured in the tuyere between the flange and the lower cylindrical member.

In addition, a method is provided for operating a fluid bed reactor comprising the steps of:

providing a fluid bed reactor comprising:

a vessel;

a reaction chamber within the vessel;

a flue at the upper end of the vessel;

a gas chamber within the vessel, the gas chamber or windbox and reaction chamber being separated by a gas distribution plate;

the gas distribution plate comprising a plurality of tuyeres secured in openings in the plate, said tuyeres comprising a first member, preferably cylindrical, having an opening therethrough which first member is secured in an opening in the distribution plate and a porous plate, and preferably a perforated plate positioned below and proximate the porous plate, secured in the opening of the first member and wherein gas passes from the gas chamber to the reaction chamber by traveling upward through the perforated plate if used, and the porous plate of the tuyere;

providing a bed of solid particles to be fluidized in the reaction chamber;

passing air or other fluidizing gas into the gas chamber which gas travels upward through the tuyeres into the reaction chamber to form a fluid bed;

removing a flue gas;

removing solid particles from the fluid bed chamber as desired;

and maintaining operating conditions in the fluid bed apparatus to perform the desired fluidized bed process.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

Figure 1:
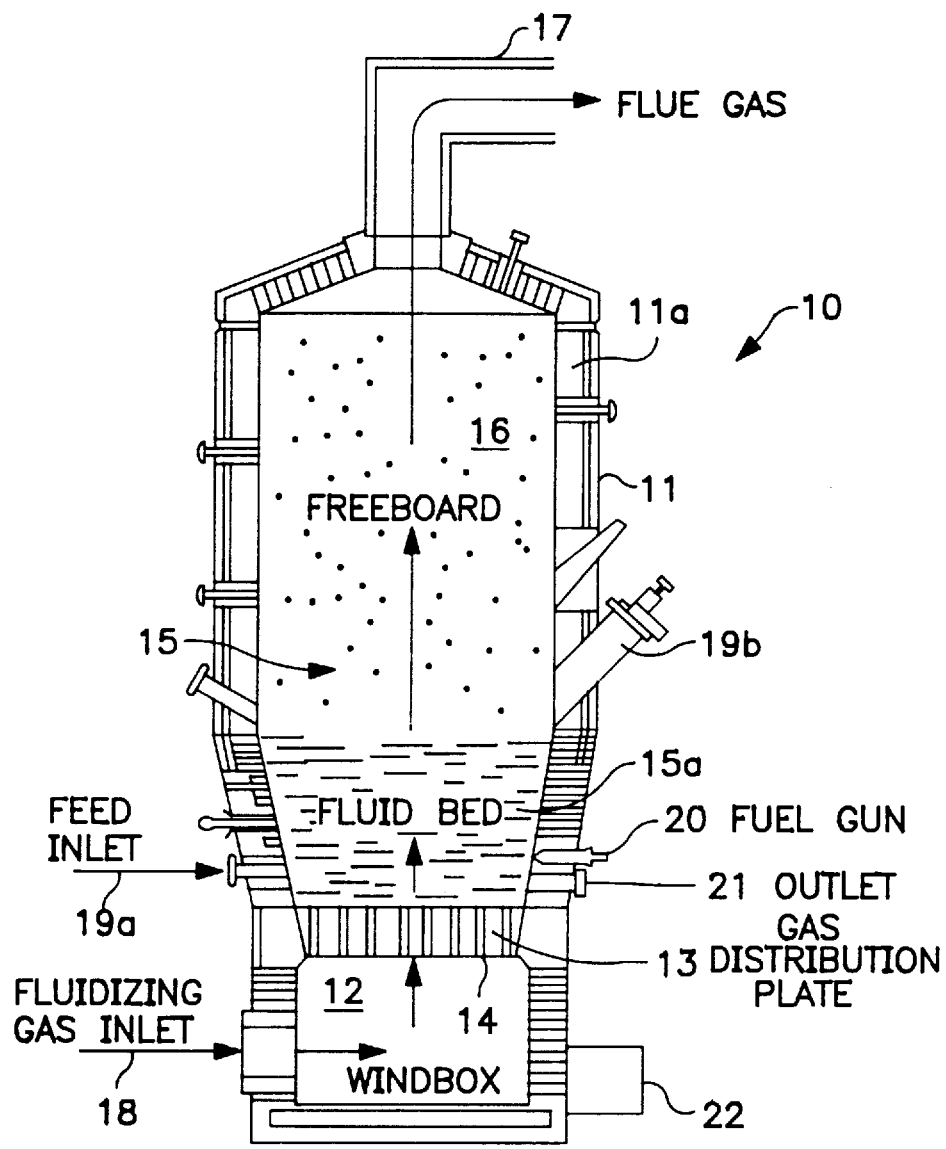
FIG. 1 is a schematic diagram of a conventional fluid bed apparatus.

In describing the preferred embodiment of the present invention, reference will be made herein to FIGS. 1–4 of the drawings in which like numerals refer to like features of the invention. Features of the invention are not necessarily shown to scale in the drawings.

Referring to FIG. 1, a fluid bed apparatus is shown generally as 10. The apparatus 10 comprises a vessel 11, a gas chamber or windbox 12 and a reaction chamber 15. The vessel 11 is usually cylindrical and made of carbon steel and typically has a refractory lining 11a to protect against the heat generated in the reactor. The vessel 11 could also be cylindrical and made of a heat resistant alloy, however, the present invention is not limited in this regard as other shapes, and materials, such as, but not limited to carbon steel with a refractory lining can be employed without departing from the broader aspects of the invention. A fluid bed 15a of solid particles mixed with a fluidizing gas is formed in reaction chamber 15 and separated from the gas chamber 12 by a gas distribution plate 13 having openings 14 therein. A freeboard section 16 is shown in the reaction chamber 15 above the fluid bed 15a and air and other gases exit the apparatus through flue 17. Air or another fluidizing gas is introduced into gas chamber 12 through line 18, and as shown by the arrows, travels upward through the gas distribution plate openings 14 thereby forming the fluid bed 15a. The gases continue traveling upward through the freeboard section 16 and are removed as flue gases in the flue 17. Feed may be introduced to the fluid bed depending on the operation to be performed through conduits 19a and/or 19b. Likewise fuel, if needed, may be introduced to the apparatus through conduit 20. Solid particulate bed material may be removed from the apparatus through outlet conduit 21.

The following description will be directed to drying a wet feed material but it will be understood to those skilled in the art that the fluid bed apparatus of the invention may be used for other processes such as, but not limited to, chemical reactions, incineration, cooling or steam generation. Basically, the wet feed is introduced to the vessel through conduit 19a and/or 19b and form the solid particulate matter of the fluid bed 15a. Sand or other inert materials may also be present in the bed 15a to function as a thermal flywheel. Heated gas is introduced through conduit 18 into gas chamber 12 and travels upward through the openings 14 in the gas distribution plate 13. The heated gas can be supplied by burning fuel in windbox burner 22. The flow of gas fluidizes the particulate wet feed and forms the fluid bed 15a which is a highly turbulent gas-solids mixture. The heated gas mixes with the wet feed and dries the feed. Moisture and gas are carried over through flue 17. Some feed particles may be entrained with the exiting gases and larger feed particles typically disengage from the flowing gas in the freeboard section 16 of the apparatus and fall back into the fluidized bed 15a. Periodically or batch-wise, the dry feed may be removed from the apparatus through conduit 21.

It will be noted from FIG. 1, that gas distribution plate 13 defines a series of openings 14 for the passage of gas therethrough to form the fluidized bed. The openings 14 are typically positioned equally along the width of the distribution plate 13 to provide a uniform flow of gas into the reaction chamber 15 which is important to forming a homogenous, steady-state fluidized bed and an efficient and effective fluid bed process.

Figure 2:
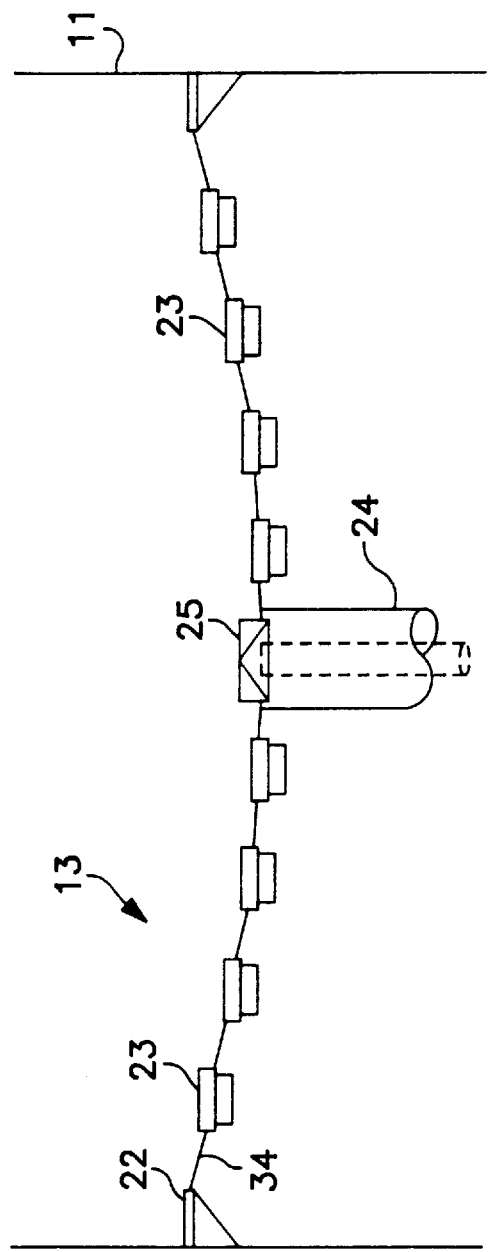
FIG. 2 is a schematic drawing of a gas distribution plate of the invention.

Referring to FIG. 2, a gas distribution plate of the invention is shown generally as 13. The gas distribution plate 13 comprises a plate 34 defining a plurality of openings in which a plurality of tuyeres 23 are secured to the plate. The plate 34 is shown as being concave in shape which is typical for many fluid bed apparatus, however, depending on the particular apparatus, the gas distribution plate 13 may also be positioned horizontally or may be convex. The plate 34 is supported by flanges 22 which are attached to the walls of vessel 11. A drain 24 is located in the center of the gas distribution plate 13, and has a drain plug 25, positioned therein, such that, the drain plug can be removed and the contents of the vessel 11 removed through drain 24. Other means can also be used to withdraw material from the vessel such as by an outlet at the vessel wall 11 of the fluid bed apparatus.

Figure 3:
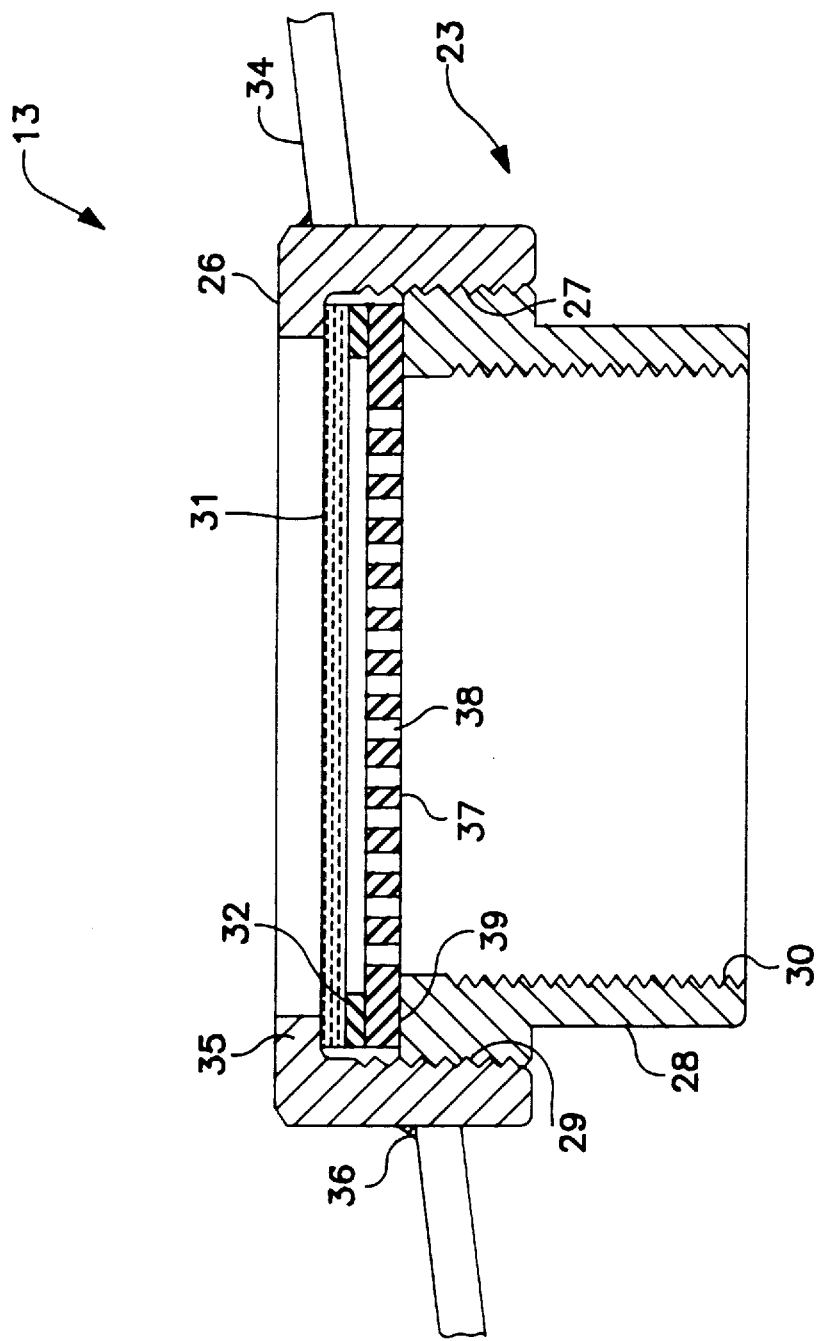
FIG. 3 is a cross-sectional view of a tuyere of the invention.

Referring now to FIG. 3, a cross-sectional view of a preferred tuyere 23 of the invention is shown as secured to plate 34 of gas distribution plate 13 in FIG. 2. The tuyere of the invention is shown generally as 23 and comprises an upper cylindrical member 26 defining an axial through hole or opening therethrough and having internal threads 27 and an inward upper flange 35. Upper cylindrical member 26 is secured to plate 34 by a welding bead 36 or other means. Mating lower cylindrical member 28 having an axial through hole or opening therethrough and having external threads 29 and internal threads 30 is shown screwed into upper cylindrical member 26 forming a gap between the lower side of flange 35 and the upper end 39 of lower cylindrical member 28. Porous plate 31 is disposed in the tuyere 23 and the upper surface of the porous plate abuts the lower side of flange 35. A gasket or washer 32 is preferably employed to separate the lower side of the porous member 31 from the top side of a perforated plate 37 shown defining openings 38 therein. The perforated plate 37 is employed in the tuyere of the present invention to enhance uniform gas (air) distribution in the fluidized bed since in some instances, the gas pressure drop through the porous plate 31 is not adequate to achieve the requisite uniform gas distribution. The complete tuyere assembly 23 is shown therefore as an upper cylindrical member 26 having an inward upper flange 35, abutting the porous plate 31, a washer or separator 32 usually of a flexible material, a perforated plate 37 and a lower cylindrical member 28. The preferred tuyere 23 is formed by screwing the lower cylindrical member 28 into the upper cylindrical member 26 with porous plate 31, washer 32 and the perforated plate 37 being secured between the upper end of lower cylindrical member 28 and the lower side of the upper flange 35. Alternatively, the lower cylindrical member 28 may be slip fit into the upper cylindrical member 26 without using threads. In addition, members 28 and 26 may be secured together by tack welding.

Figure 4:
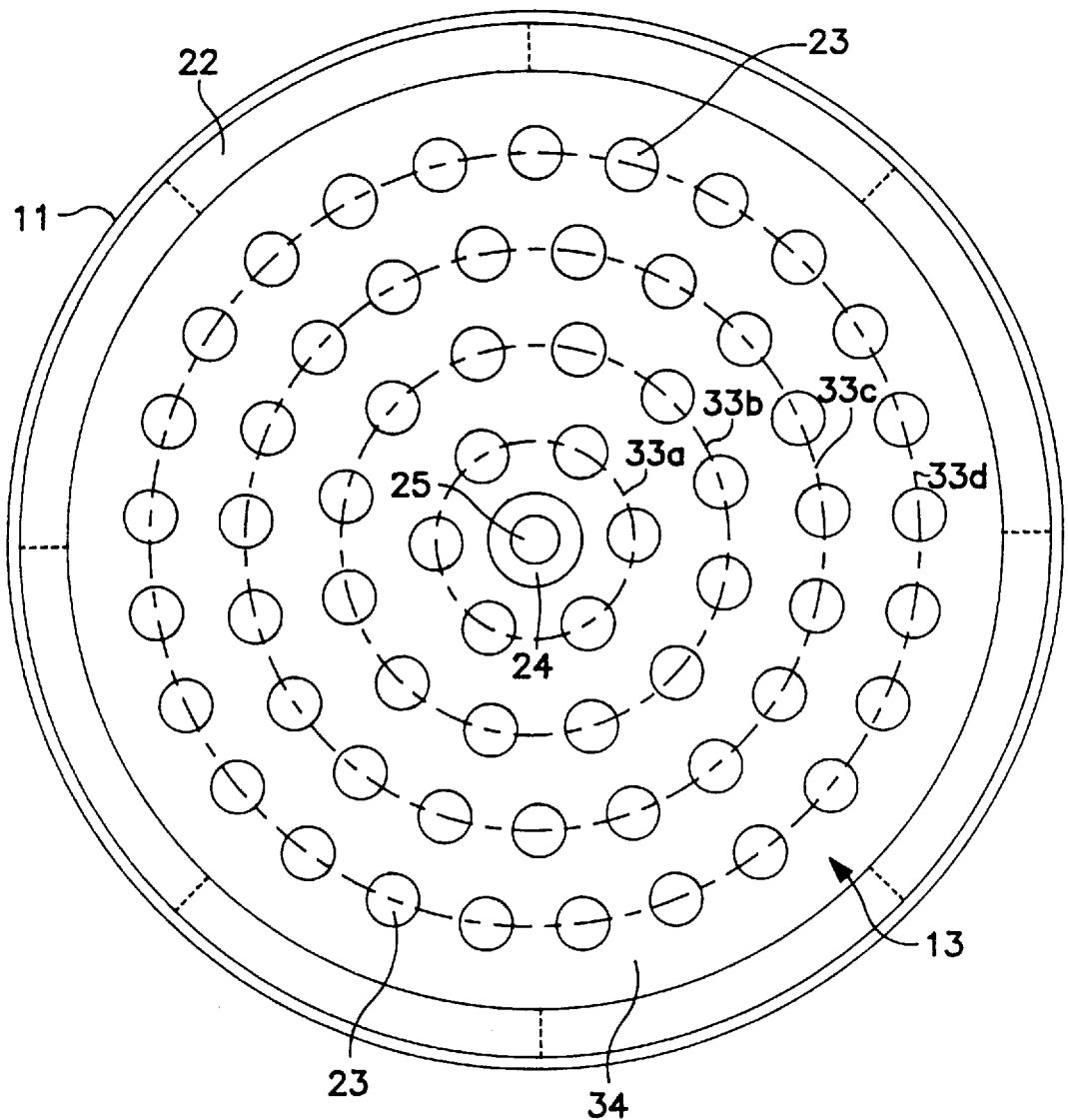
FIG. 4 is a top plan view of a gas distribution plate of the invention showing a typical tuyere configuration in the plate.

Referring to FIG. 4, a top plan view is shown of a typical gas distribution plate 13. Tuyeres 23 are shown positioned equally in concentric circles in plate 34. Inner concentric circle 33a is shown containing six equally spaced tuyeres 23. The next concentric circle 33b is shown having 12 equally spaced tuyeres and so on for concentric circles 33c and 33d. The plate 34 of gas distributor plate 13 is supported in vessel 11 by peripheral flange 22. Drain 24 is shown in the middle of the gas distributor plate 13 having a drain plug 25 disposed therein.

As can be seen from the gas distribution plate 34 of FIG. 4, the tuyeres 23 are positioned to provide a uniform distribution of gas into the bed or reaction chamber for a uniform bed mixture and fluidization.

Any number or size of tuyeres can be employed in the gas distribution plate of a fluid bed apparatus. In general, the tuyeres are small in diameter relative to the diameter of the air distribution plate. Preferably the tuyeres are round and define an outside diameter between 1 and 12 inches. However, the invention is not limited in this regard as tuyeres defining other outside diameters, may be used without departing from the broader aspects of the invention.

The porous plate 31 may be selected from the a variety of materials such as sintered Hastelloy X, sintered Inconel 600, sintered 316L stainless steel, porous ceramics or ceramic fiber. The porous plate may also have a wide variety of thicknesses and will generally be approximately 0.03 to 0.2 inches thick. The porous plate width (diameter) is sized to fit inside the upper cylindrical member 26 and is typically 2¾ to 4¼ inches. Wider porous plates can be used but are more susceptible to damage. The perforated plate is similarly sized to the porous plate and the thickness of the perforated plate and number of perforations will vary depending on operating conditions and the desired pressure drop across the tuyere needed to achieve uniform air flow distribution.

It is preferred that a washer or other flexible member be provided between the lower side of the porous member and the upper side of perforated plate 37 to provide both a cushioning (stress relieving) and sealing effect. It is also preferred for some applications to provide washers between the upper surface of the porous plate 31 and lower surface of flange 35 and/or between the upper surface of lower cylindrical member 28 and lower surface of perforated plate 37. The washer is typically heat resistant.

The plate 34 of the gas distributor plate 13 is usually made from 316L stainless steel but may be made from any number of other metals or other materials depending on the fluid bed apparatus and process to be performed therein. As shown in FIG. 4, the gas distributor plate 13 will preferably include a plurality of tuyeres 23 secured to and equally distributed across the face of the plate.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention. Thus, having described the invention;

What is claimed is:

1. A fluid bed apparatus comprising:
   a vessel having an upper end;
   a reaction chamber within the vessel;
   a flue at the upper end of the vessel;
   a gas chamber within the vessel, the gas chamber and reaction chamber being separated by a gas distribution plate;
   the gas distribution plate defining a plurality of openings;
   a plurality of tuyeres each positioned in a respective one of the plurality of openings;
   said tuyeres, including a first member defining an opening therethrough, the first member being secured in one of said openings defined by the distribution plate, and a porous plate secured in the opening of the first member, such that gas passes from the gas chamber to the reaction chamber by traveling upward through the porous plate of the tuyere.

2. The apparatus of claim 1 wherein the gas distribution plate further comprises a perforated plate positioned below and proximate the porous plate.

3. The apparatus of claim 2 wherein the first member is cylindrical and has an inward flange at an upper end to secure the porous and perforated plates in the tuyere.

4. The apparatus of claim 3 wherein a second cylindrical member is secured to the first member to secure the porous and perforated plates in the tuyere between the flange and the second member.

5. A method for operating a fluid bed reactor comprising the steps of:
   providing a fluid bed reactor having a vessel, a reaction chamber within the vessel, a flue at the upper end of the vessel, a gas chamber within the vessel, the gas chamber and reaction chamber being separated by a gas distribution plate, the gas distribution plate defining a plurality of openings in the plate, a plurality of tuyeres, each positioned in a respective one of the plurality of openings, said tuyeres having a first member defining an opening therethrough which first member is secured in an opening in the distribution plate and a porous plate secured in the opening of the first member and wherein gas passes from the gas chamber to the reaction chamber by traveling upward through the porous plate of the tuyere;
   providing a bed of solid particles to be fluidized in the reaction chamber;
   passing air or other fluidizing gas into the gas chamber which gas travels upward through the tuyeres into the reaction chamber to form a fluid bed;
   removing a flue gas;
   removing solid particles from the fluid bed chamber as desired; and
   maintaining operating conditions in the fluid bed apparatus to perform the desired fluidized bed process.

6. The method of claim 5 wherein the gas distribution plate further comprises a perforated plate positioned below and proximate to the porous plate.

7. The method of claim 6 wherein the first member is cylindrical and has an inward flange at an upper end to secure the porous and perforated plates in the tuyere.

8. The method of claim 7 wherein a second cylindrical member is secured to the first member to secure the porous and perforated plates in the tuyere between the flange and second member.

9. A tuyere for use in a gas distribution plate of a fluid bed reactor comprising a first member defining an opening therethrough which first member is secured in an opening defined by the distribution plate and a porous plate secured in the opening of the first member and wherein gas flowing through the fluid bed reactor passes through the porous plate.

10. The tuyere of claim 9 wherein the tuyere additionally comprises a perforated plate positioned below and proximate to the porous plate.

11. The tuyere of claim 10 wherein the first member is cylindrical and has an inward flange at its upper end to secure the porous and perforated plates in the tuyere.

12. The tuyere of claim 11 wherein a second cylindrical member is secured to the first member to secure the porous plate and perforated plate in the tuyere between the flange and second member.

13. A gas distribution plate for a fluid bed reactor comprising a plurality of tuyeres as defined in claim 9.

14. A gas distribution plate for a fluid bed reactor comprising a plurality of tuyeres as defined in claim 12.

* * * * *